United States Patent
Yeo (10) Patent No.: US 6,977,765 B1
(45) Date of Patent: Dec. 20, 2005

(54) DIFFRACTIVE LIGHT MODULATOR USING CANTILEVERS

(75) Inventor: In-Jae Yeo, Kyunggi-do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 0 days.

(21) Appl. No.: 10/951,260

(22) Filed: Sep. 27, 2004

(30) Foreign Application Priority Data

Sep. 6, 2004 (KR) .................. 10-2004-0070828
Sep. 6, 2004 (KR) .................. 10-2004-0070829

(51) Int. Cl.$^7$ ............................................. G02B 26/00
(52) U.S. Cl. ...................................... 359/291; 359/563
(58) Field of Search .................. 359/291, 290, 359/298, 223, 224, 558, 563, 572, 573

(56) References Cited

U.S. PATENT DOCUMENTS

| | | | | |
|---|---|---|---|---|
| 5,999,319 A | * | 12/1999 | Castracane | 359/573 |
| 6,618,187 B2 | * | 9/2003 | Pilossof | 359/295 |
| 6,870,982 B1 | * | 3/2005 | Maheshwari | 385/16 |

* cited by examiner

Primary Examiner—Scott J. Sugarman
Assistant Examiner—Tuyen Tra
(74) Attorney, Agent, or Firm—Christensen O'Connor Johnson Kindness PLLC

(57) ABSTRACT

The present invention relates generally to a diffractive light modulator using cantilevers. The diffractive light modulator reflects and diffracts incident beams depending on a height difference formed when neighboring cantilevers, which are constructed in such a way that the first ends thereof are supported by one or more support units and the second ends thereof are free, bend (curve) in the same direction or opposite directions.

15 Claims, 10 Drawing Sheets

DIFFRACTIVE LIGHT MODULATOR USING CANTILEVERS

BACKGROUND OF THE INVENTION

1. Field of the Invention

The present invention relates generally to a diffractive light modulator and, more particularly, to a diffractive light modulator, which reflects and diffracts incident light depending on the height difference between neighboring cantilevers that are constructed in such a way that the first ends thereof are supported by one or more support units and the second ends thereof are free.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase filter, an optical logic gate, a light amplifier, an image processing technique, an optical device, and a light modulator using a spatial light modulation theory.

The spatial light modulator is applied to optical memory, optical display device, printer, optical interconnection and hologram fields, and studies have been conducted to develop a display device employing it.

Figure 1:
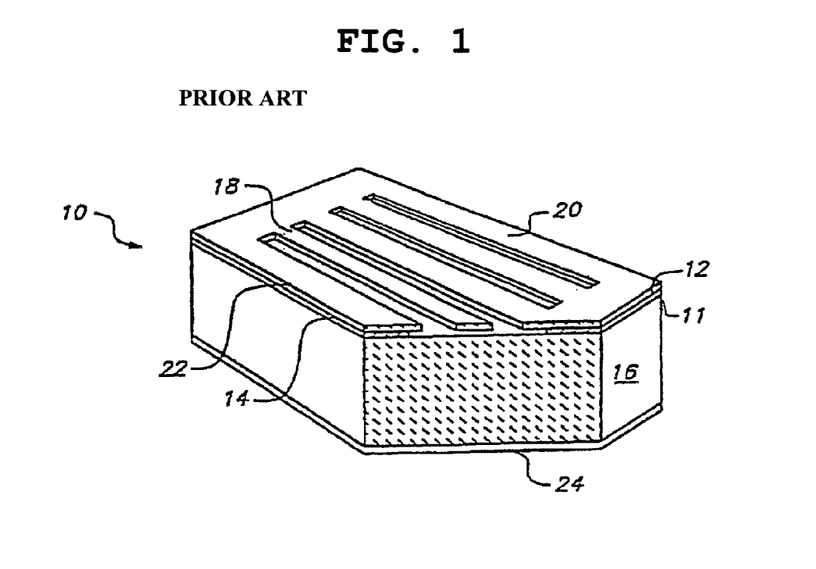
FIG. 1 illustrates a conventional electrostatic type grating light modulator.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda$, the modulator is designed so that thicknesses of the ribbons 18 and oxide spacer 12 are each $\lambda/4$.

Limited by a vertical distance (d) between a reflective surface 22 of each ribbon 18 and a reflective surface of the substrate 16, a grating amplitude of the modulator 10 is controlled by applying voltage between the ribbon 18 (the reflective surface 22 of the ribbon 18 acting as a first electrode) and the substrate 16 (a conductive layer 24 formed on a lower side of the substrate 16 to act as a second electrode).

Figure 2:
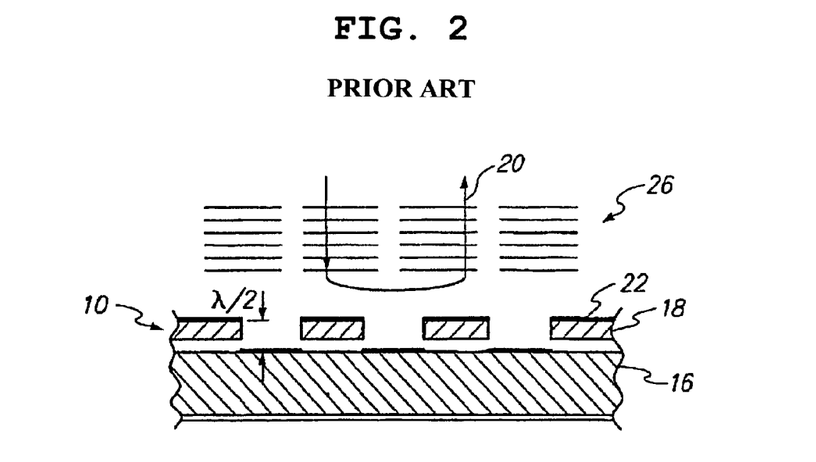
FIG. 2 illustrates the reflection of incident light by the conventional electrostatic type grating light modulator.

In an undeformed state of the light modulator with no voltage application, the grating amplitude is $\lambda/2$ while a total round-trip path difference between light beams reflected from the ribbon and substrate is $\lambda$. Thus, a phase of reflected light is reinforced.

Accordingly, in the undeformed state, the modulator 10 acts as a plane mirror when it reflects incident light. In FIG. 2, the reference numeral 20 denotes the incident light reflected by the modulator 10 in the undeformed state.

Figure 3:
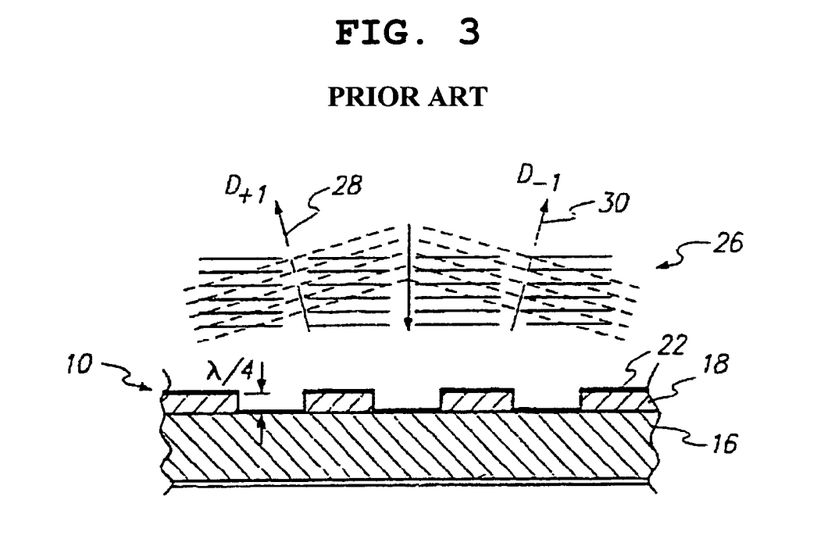
FIG. 3 illustrates the diffraction of incident light by the conventional electrostatic type grating light modulator.

When proper voltage is applied between the ribbon 18 and substrate 16, the electrostatic force enables the ribbon 18 to move downward toward the surface of the substrate 16. At this time, the grating amplitude is changed to $\lambda/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, reference numerals 28 and 30 denote light beams diffracted in +/−diffractive modes (D+1, D−1) in the deformed state, respectively.

However, the above-described conventional light modulator must displace the ribbons in a vertical direction to diffract incident light, so that the conventional light modulator is disadvantageous in that bending is formed on the portions of the ribbons that reflect and diffract the incident light, thus deteriorating the characteristics of reflected and diffracted light.

Furthermore, the conventional light modulator is problematic in that high actuating voltage is not only required, but the actuating speed thereof is also slow because the conventional modulator must displace the ribbons in a vertical direction to reflect and diffract incident light.

Furthermore, the ribbons of the conventional modulator must be manufactured to have a thickness of about 0.5 $\mu$m, so that it is difficult to perform a process of manufacturing the conventional modulator. Accordingly, the conventional light modulator is problematic in that it is difficult to achieve the mass production of light modulators that are accurately operated.

SUMMARY OF THE INVENTION

Accordingly, the present invention has been made keeping in mind the above problems occurring in the prior art, and an object of the present invention is to provide a diffractive light modulator, which reflects and diffracts incident light depending on the height difference between cantilevers that are constructed in such a way that the first ends thereof are supported by one or more support units and the second ends thereof are free.

In order to accomplish the above object, the present invention provides a diffractive light modulator, including one or more support units; a plurality of cantilevers constructed in such a way that the first ends thereof are supported by the support units and the second ends thereof are free, the first ends thereof being supported by the support units, respectively, so that each of the first ends, together with neighboring one of the first ends, forms a predetermined length offset; and actuating units formed on the first ends of the cantilevers, respectively, and adapted to apply actuating power. The neighboring cantilevers may bend in the same direction around support axes that are formed at different positions due to the offset, thereby forming a height difference between the neighboring cantilevers.

In order to accomplish the above object, the present invention provides a diffractive light modulator, including support units arranged at opposite positions while remaining spaced apart from each other by a predetermined distance; a plurality of cantilevers constructed in such a way that the first ends thereof are attached to the support units and the second ends thereof are free, and alternately supported by the support units; and actuating units formed on the first ends of the cantilevers, respectively, and adapted to apply actuating power. The alternately arranged neighboring cantilevers may form a height difference while bending in opposite directions around different support axes.

BRIEF DESCRIPTION OF THE DRAWINGS

The above and other objects, features and advantages of the present invention will be more clearly understood from the following detailed description taken according to the accompanying drawings, in which.

DESCRIPTION OF THE PREFERRED EMBODIMENTS

Reference now should be made to the drawings, in which the same reference numerals are used throughout the different drawings to designate the same or similar components.

The construction and operation of a diffractive light modulator using cantilevers according to embodiments of the present invention are described in detail with reference to the attached drawings below.

A diffractive light modulator using cantilevers according to an embodiment of the present invention diffracts incident light depending on the height difference between cantilevers that bend by a certain angle according to actuating power. As shown in FIGS. 4a to 6, the diffractive light modulator includes one or more support units 100, cantilevers 200 and actuating units 300.

Figure 9:
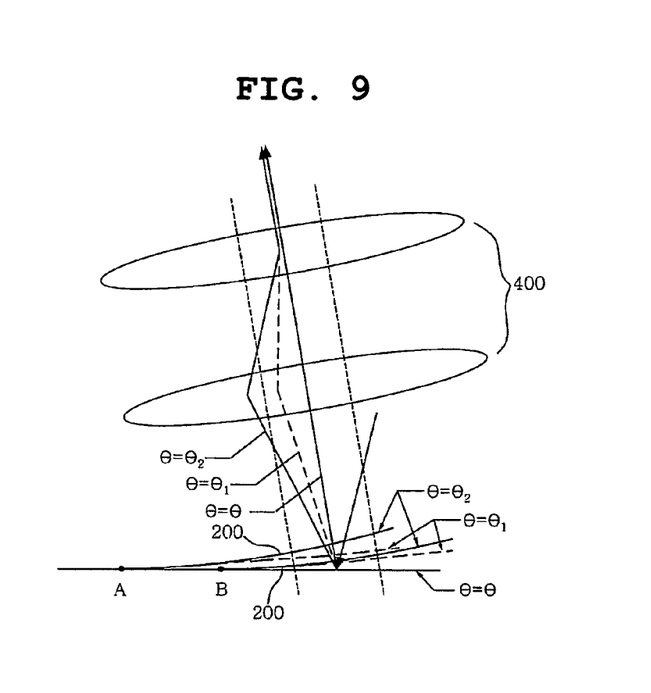
FIG. 9 is a view showing light paths of reflected and diffracted beams that are caused by the height difference between the neighboring cantilevers according to the embodiment of the present invention.

The diffractive light modulator of the present invention may further include an angle correction unit 400 for correcting the light path difference between diffracted light beams that are caused by the bending angle difference between cantilevers 200 as shown in FIG. 9.

Figure 4A:
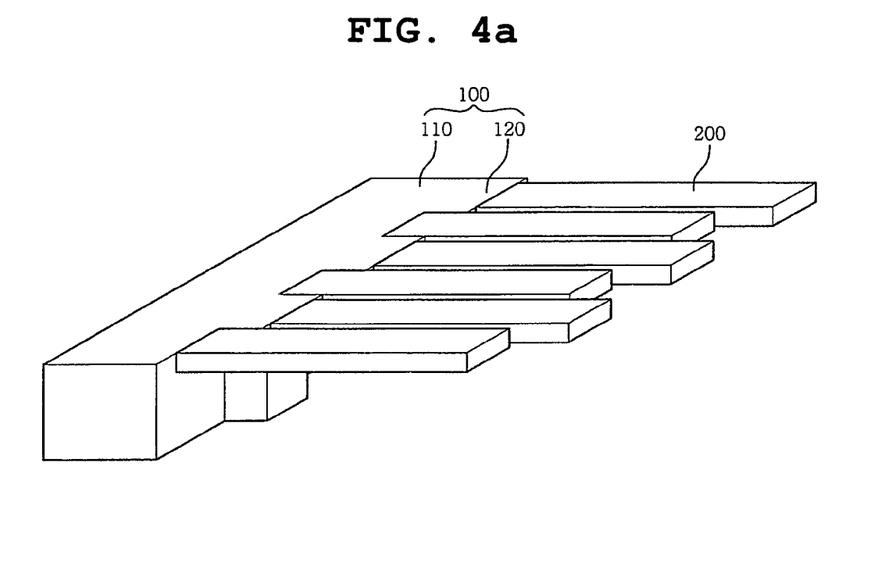
FIGS. 4a to 4c are views showing the construction of cantilevers according to an embodiment of the present invention.

The support unit 100 of FIG. 4a functions to support the first ends of the cantilevers 200 that diffract and reflect incident light beams. As shown in FIG. 4a, the support unit 100 may include a body 110, and protrusions 120 integrated with the body 110 at regular intervals.

In this case, an offset of a predetermined length that corresponds to the length of each of the protrusions 120 is formed between cantilevers 200 attached to and supported by the body 110 of the support unit 100 and cantilevers 200 attached to and supported by the protrusions 120 of the support unit 100, so that the support axes of the cantilevers 200 are formed at different positions.

Accordingly, when the neighboring cantilevers 200 bend in the same direction with the predetermined length offset caused by the protrusions 120 of the support unit 100, the neighboring cantilevers 200 bend in the same direction around the support axes differently formed due to the offset, thereby forming a height difference that corresponds to $(\alpha_0/4)*r$ (r is a real number) with respect to a wavelength $\lambda_0$ of incident light.

Figure 4B:
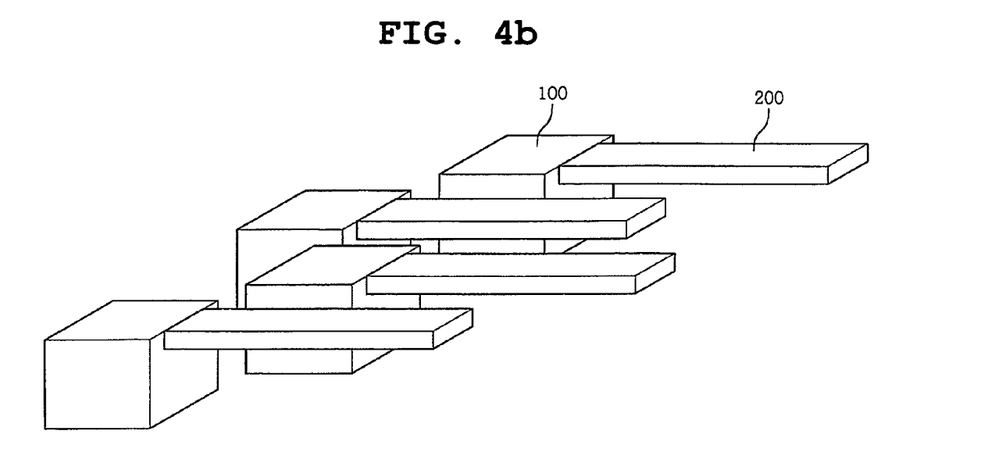

Furthermore, the support units 100 of FIG. 4b function to support the first ends of the cantilevers 200, respectively, that diffract and reflect incident beams. As shown in FIG. 4b, the cantilevers 200 may be formed in box shapes and arranged to be spaced apart from each other by a predetermined distance, and the neighboring support units 100 may be arranged to allow a predetermined length offset to be formed between the neighboring support units 100.

When the cantilevers 200 are attached to the neighboring support units 100, respectively, with the predetermined length offset formed therebetween, the cantilevers 200 have support axes at different positions due to the offset between the support units 100.

Accordingly, when the neighboring cantilevers 200, in which the predetermined length offset is formed due to the offset between the support units 100, bend in the same direction, a height difference that corresponds to $(\lambda_0/4)*r$ (r is a real number) with respect to a wavelength $\lambda_0$ of incident light is formed due to the different support axes of the neighboring cantilevers 200.

Figure 4C:
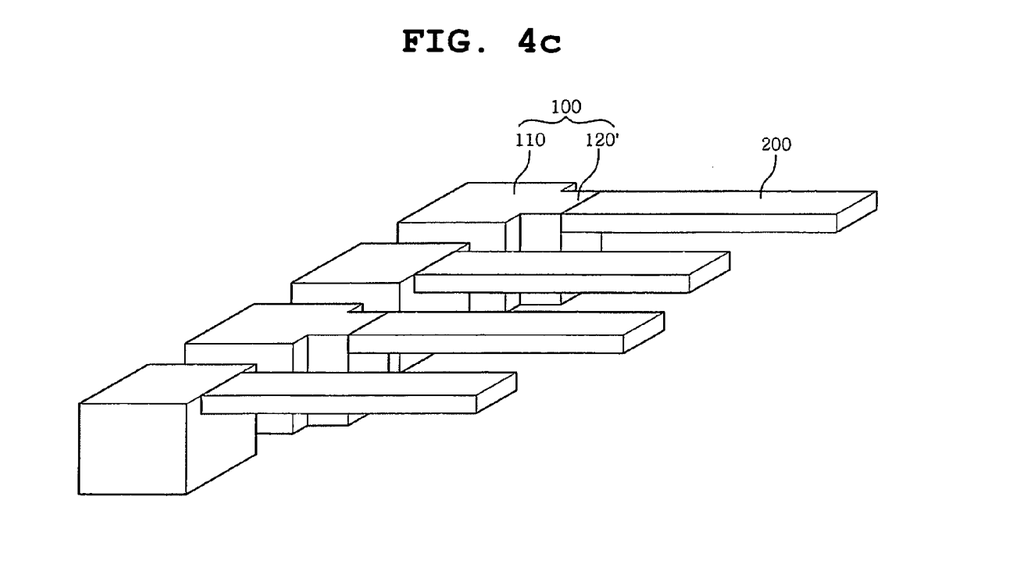

Furthermore, the support units 100 of FIG. 4c function to support the first ends of the cantilevers 200 that diffract and reflect incident beams. As shown in FIG. 4c, the support units 100 may be formed in box shapes and arranged in such a way that support units 100 with protrusions 120' formed on the first sides thereof and support units 100 without protrusions 120' are alternately arranged in a line.

In this case, a predetermined length offset corresponding to the length of each of the protrusions 120' is formed between the cantilevers 200 that are attached to and supported by the support units 100 with the protrusions 120', and the cantilevers 200 that are attached to and supported by the support units 100 without the protrusions 120', so that the support axes of the cantilevers 200 are formed at different positions.

Accordingly, when the neighboring cantilevers 200 bend in the same direction with the predetermined length offset formed by the protrusions 120' of the support units 100, a height difference that corresponds to $(\lambda_0/4)*r$ (r is a real number) with respect to a wavelength $\lambda_0$ of incident light is formed due to the different support axes of the neighboring cantilevers 200.

In this case, the support units 100 is not limited to have such box shapes, but may be formed in any shape that allows the first ends of the cantilevers to be attached thereto and supported thereby.

The cantilevers 200 function to form beams, reflected and diffracted by a certain angle, by reflecting and diffracting incident beams. As shown in FIGS. 4a to 4c, the cantilevers 200 are constructed in such a way that the first ends thereof are attached to and supported by the support units 100, respectively, and the second ends thereof are free.

The cantilevers 200 are manufactured to have a height of 3 to 5 µm and a length of 100 to 120 µm using a Silicon On Insulator (SOI).

In this case, a predetermined length offset is formed due to an offset that is generated by the protrusions 120 and 120' formed on the support units 100 or the arrangement of the support units 100, so that the support axes of the cantilevers 200 are formed at different positions.

The cantilevers 200 bend (curve) in a certain direction according to the amount of externally applied actuating power, thereby forming curved areas 210 where the cantilevers 200 start to bend, and effective mirror areas 220 that allow the cantilevers 200 to reflect and diffract incident light.

Figure 5:
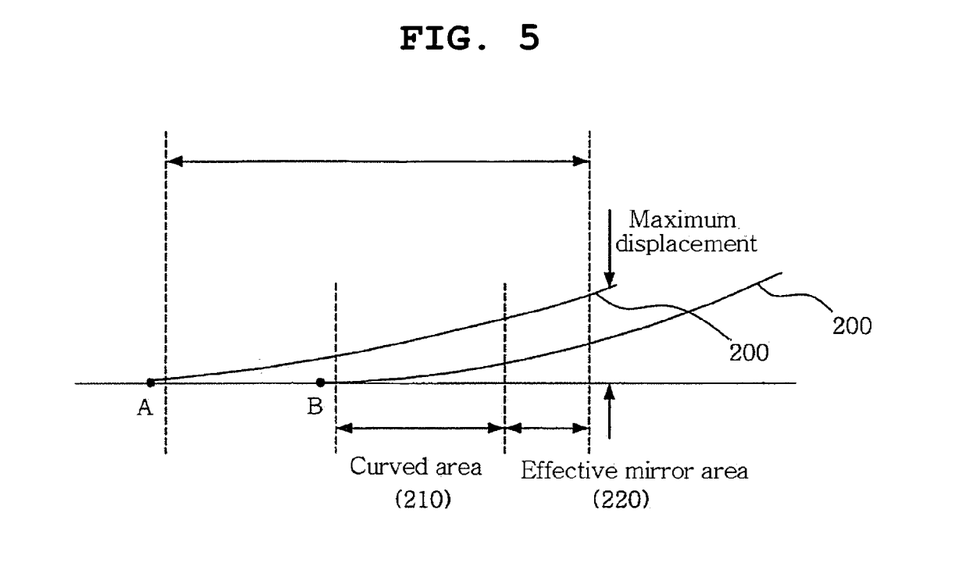
FIG. 5 is a view showing curved areas and effective mirror areas between neighboring cantilevers according to the embodiment of the present invention.

The operation of the cantilevers 200 is described in detail with reference to FIG. 5. When a certain amount of external actuating power is applied to the cantilevers 200, the cantilevers 200 bend (curve) according to the amount of the actuating power, thereby forming curved areas 210 where the cantilevers 200 start to bend, and effective mirror areas 220 that allow the cantilevers 200 to reflect incident light.

When the cantilevers 200 bend according to the applied actuating power in the same direction around support axes A and B that are formed at different positions, the effective mirror areas 220 of the cantilevers 200 bend in the direction normal to the bending direction, thereby forming a certain height difference between the effective mirror areas 220 of the neighboring cantilevers 200.

In that case, the height difference between the effective mirror areas 220 corresponds to $(\lambda_0/4)*r$ with respect to a wavelength $\lambda_0$ of incident light, thereby allowing the incident light to be reflected and diffracted.

According to the above-described principle, the cantilevers 200 reflect and diffract the incident light depending on the height difference between the neighboring cantilevers 200, thereby forming reflected beams having a 0th order diffraction coefficient and diffracted beams having a certain diffraction coefficient.

In that case, it is possible to control the extent of bending (curving) according to the amount of the applied actuating power, so that it is possible to control the extent of diffraction with respect to incident light.

Figure 6:
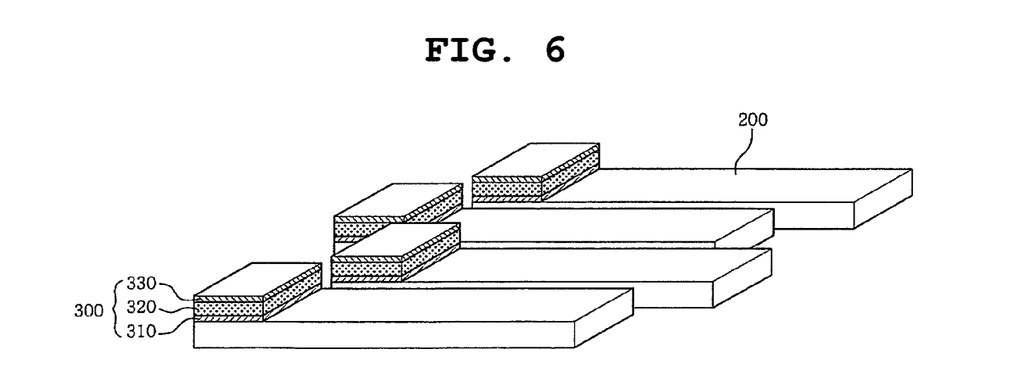
FIG. 6 is view showing actuating units formed on the first ends of the cantilevers, respectively, according to the embodiment of the present invention.

Actuating units 300 formed on the first ends of the cantilevers 200 function to supply actuating power for bending the cantilevers 200 by a certain angle, respectively. As shown in FIG. 6, each of the actuating units 300 includes a lower electrode layer 310, a piezoelectric layer 320 and an upper electrode layer 330.

The lower electrode layer 310 is formed on the first end of each of the cantilevers 200, and adapted to receive actuating power from an external power source and provide the actuating power to the piezoelectric layer 320. The lower electrode layer 310 is formed by a sputtering or evaporation process that uses an electrode material such as Pt, Ta/Pt, Ni, Au, Al or $RuO_2$.

The piezoelectric layer 320 is interposed between the lower electrode layer 310 that has been described above and the upper electrode layer 330 that will be described later. The piezoelectric layer 320 shrinks and expands in a vertical or lateral direction according to the actuating power applied by the lower and upper electrode layers 310 and 330, thus functioning to bend a corresponding cantilever 200 by a certain angle. The piezoelectric layer 320 is composed of a piezoelectric member made of a material such as PzT, PNN-PT, ZnO, $P_b$, Zr or Ti.

The piezoelectric layer 320 is formed on the lower electrode layer 310 to have a depth of 0.01 to 20.0 µm using a wet process (e.g., screen printing, sol-gel coating, etc.) or dry process (e.g., sputtering, evaporation, vapor deposition, etc.).

The upper electrode layer 330, together with the lower electrode layer 310, functions to provide the externally applied actuating power to the piezoelectric layer 320. In particular, the upper electrode layer 330 is formed by placing an electrode material, such as Pt, Ta/Pt, Ni, Au, Al or $RuO_2$, on the piezoelectric layer 320 using a sputtering or evaporation process.

Although the actuating units 300 can be implemented using above-described piezoelectric elements, the present invention is not limited thereto, and the actuating units 300 may be implemented to use an electrostatic or electromagnetic force.

A process of operating a diffractive light modulator using cantilevers according to an embodiment of the present invention is described with reference to FIGS. 7a to 9 below.

FIGS. 7a to 7f are views showing the operation of cantilevers bending upward according to the actuating power in accordance with the present invention. FIGS. 8a to 8f are views showing the operation of cantilevers bending downward according to the actuating power in accordance with the present invention. FIG. 9 is a view showing the light paths of reflected and diffracted beams caused by the height difference between neighboring cantilevers according to the present invention.

The operation of cantilevers bending upward and downward according to the present invention is described in detail with reference to FIGS. 7a to 8f.

For the convenience of description, the operation of the cantilevers 200 bending upward is described with reference to FIGS. 7a to 7f, but a description of the operation of cantilevers 200 bending downward as shown in FIGS. 8a to 8f is omitted because the operation of the cantilevers 200 bending downward is the same as that of the cantilevers 200 bending upward.

Figure 7A:
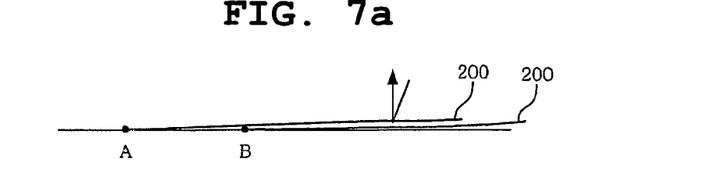
FIGS. 7a to 7f are views showing the operation of the cantilevers bending upward according to actuating power in accordance with the embodiment of the present invention.
Figure 7B:
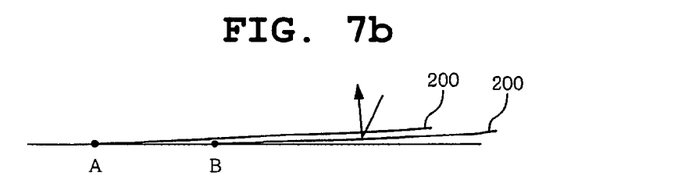
Figure 7C:
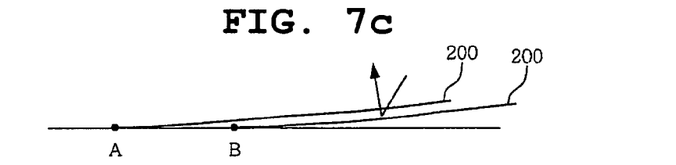
Figure 7D:
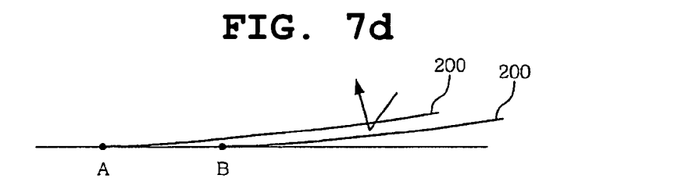
Figure 7E:
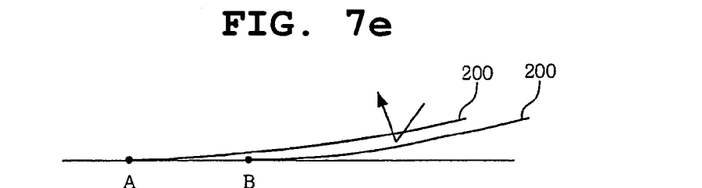
Figure 7F:
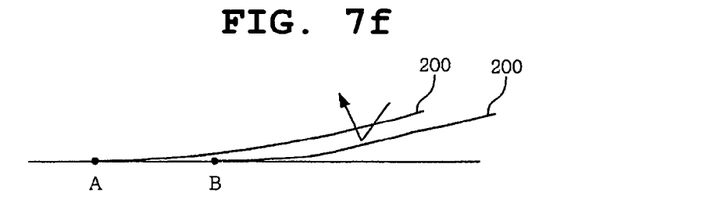
Figure 8A:
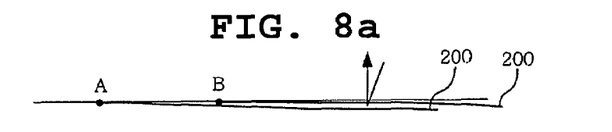
FIGS. 8a to 8f are views showing the operation of the cantilevers bending downward according to actuating power in accordance with the embodiment of the present invention.
Figure 8B:
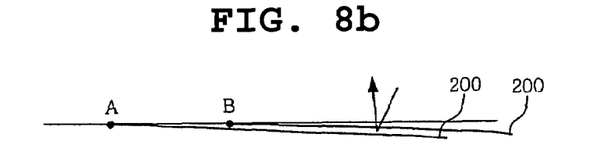
Figure 8C:
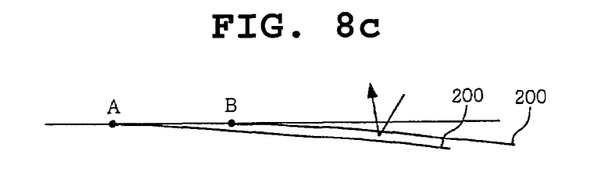
Figure 8D:
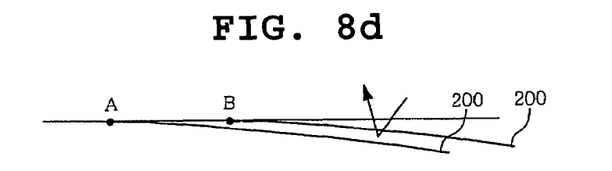
Figure 8E:
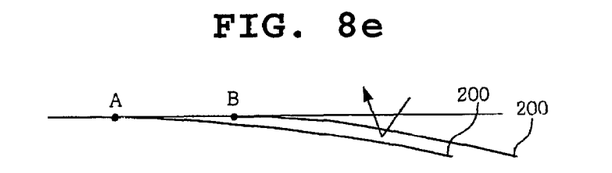
Figure 8F:
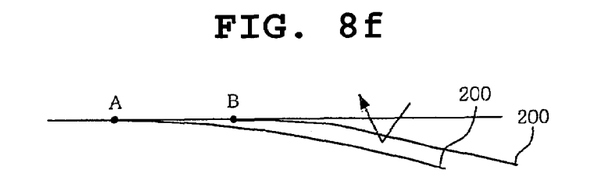

As shown in FIG. 7a, the cantilevers 200 are constructed in such a way that the first ends thereof are attached to and supported by the support units 100, respectively, and the second ends thereof are not supported by the support units 100, and a predetermined length offset is formed between the neighboring cantilevers 200 due to an offset that is generated by protrusions 120 and 120' formed on the support units or the arrangement of the support units 100, so that support axes A and B of the cantilevers 200 are formed at different positions.

As described above, when actuating power is applied to the neighboring cantilevers 200 that has the support axes A and B at different positions, respectively, the cantilevers 200 identically bend (curve) upward or downward according to the amount of the applied actuating power. Accordingly, the effective mirror areas 220 of the cantilevers 200 bend in the direction tangential to the bending (curving) direction, thereby forming a height difference that corresponds to $(\lambda_0/4)*r$ (r is a real number) with respect to a wavelength $\lambda_0$ of incident light.

In that case, it is possible to control the extent of the bending (curving) of the cantilevers 200 by controlling the amount of the actuating power applied by the actuating units 300, so that it is possible to control the intensities of reflected and diffracted beams with respect to incident light beams.

As described above, the light modulator of the present invention reflects and diffracts incident light depending on the height difference between the effective mirror areas 220 of the neighboring cantilevers 200, thereby forming reflected beams having a 0th order diffraction coefficient and diffracted beams having a certain diffraction coefficient.

The operation of the cantilevers 200 is described in more detail with reference to FIG. 9. In the case where actuating power is not applied to the neighboring cantilevers 200 having a predetermined length offset between support units 100, the effective mirror areas 220 of the neighboring cantilevers 200 maintain a planar state ($\theta=0$), so that the cantilevers 200 function as a reflector that reflects incident light by a certain angle.

However, in the case where actuating power is applied to the neighboring cantilevers 200 having the predetermined length offset between the support units 100, the effective mirror areas 220 of the neighboring cantilevers 200 bend in the same direction according to the amount of the applied actuating power, thereby forming a certain angle ($\theta=\theta_1$ or $\theta=\theta_2$).

As described above, when the neighboring cantilevers 200 bend in the same direction by a certain angle ($\theta=\theta_1$ or $\theta=\theta_2$), the effective mirror areas 220 of the neighboring cantilevers 200 form a height difference that corresponds to $(\lambda_0/4)*r$ with respect to a wavelength $\lambda_0$ of incident light, so that the cantilevers 200 function as a diffractor that diffracts incident light by a certain angle.

In this case, reflected and diffracted beams caused by the height difference between the neighboring cantilevers 200 are reflected and diffracted by various angles, but move forward in a light path direction due to cylindrical lenses that are an angle correction unit 400 arranged in a direction in which the cantilevers 200 are arranged.

The construction and operation of a diffractive light modulator using cantilevers according to another embodiment of the present invention are described in detail with reference to FIGS. 10a to 12.

The diffractive light modulator using cantilevers according to another embodiment of the present invention diffracts incident light depending on the height difference between cantilevers that bend by a certain angle according to actuating power. As shown in FIGS. 10a to 12, the diffractive light modulator includes support units 100, cantilevers 200 and actuating units 300.

Figure 14:
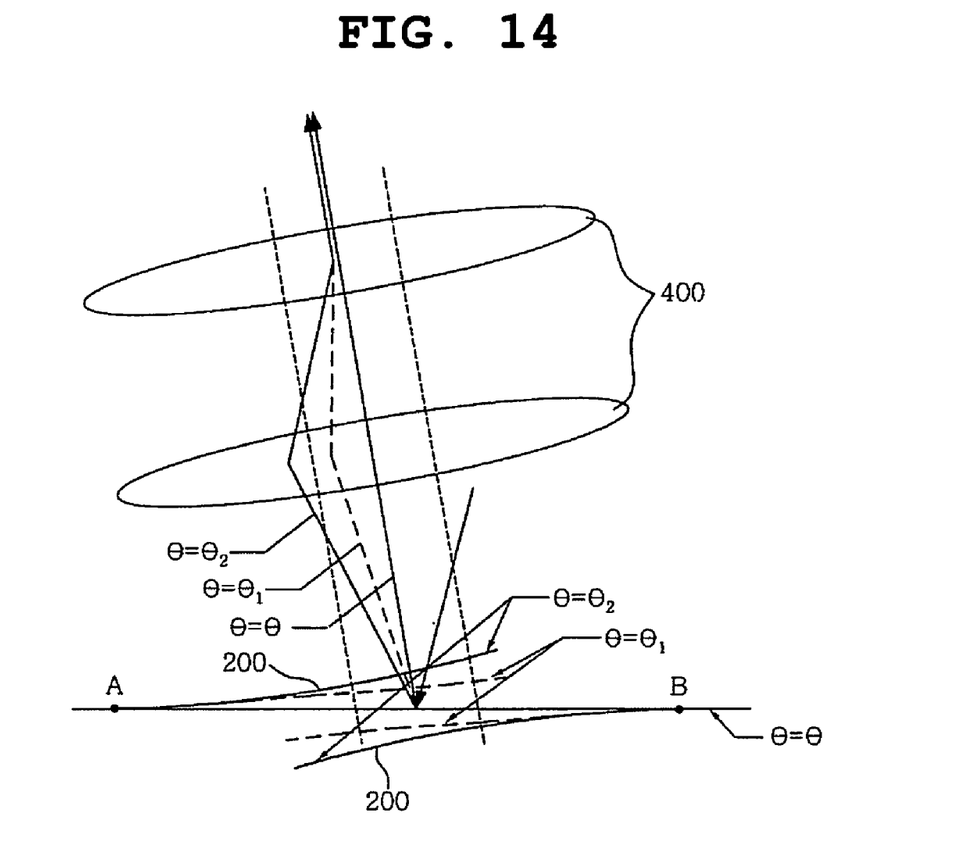
FIG. 14 is a view showing the light paths of reflected and diffracted beams that are caused by the height difference between the symmetrically neighboring cantilevers according to another embodiment of the present invention.

The light modulator using symmetric cantilevers according to another embodiment of the present invention may further include an angle correction unit 400 for correcting the light path difference between diffracted beams caused by the bending (curving) difference between cantilevers as shown in FIG. 14.

Figure 10A:
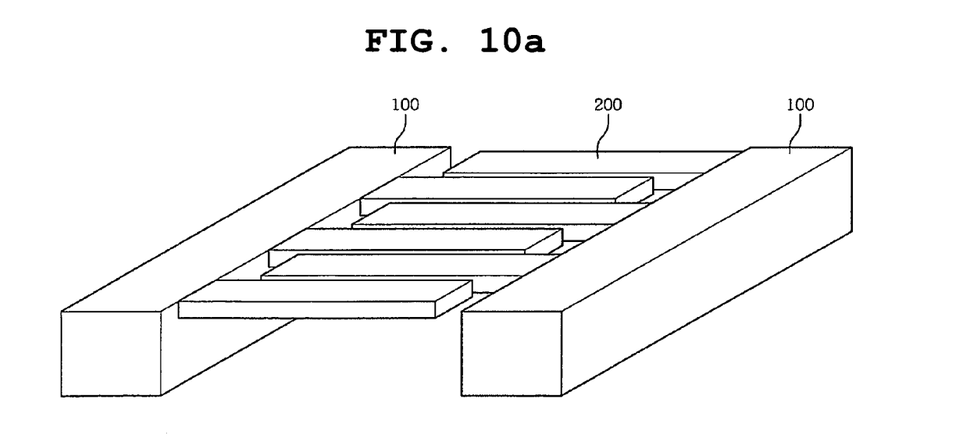
FIGS. 10a and 10b are views showing the construction of a diffractive light modulator using symmetric cantilevers according to another embodiment of the present invention.

The support units 100 function to support the first ends of the cantilevers 200 that reflect and diffract incident light, respectively. As shown in FIG. 10a, the support units 100 may be formed in rectangular shapes, in which the longitudinal axes thereof are formed along the arrangement of the cantilevers 200, while remaining spaced apart from each other by a predetermined distance.

The cantilevers 200 are alternately attached to the support units 100 that are arranged at opposite positions. Accordingly, the cantilevers 200 have different support axes at opposite positions, thereby bending in opposite directions according to applied actuating power.

Accordingly, when the cantilevers 200 alternately attached to the support units 100 bend in opposite directions, the neighboring cantilevers 200 bend in opposite directions around the support axes formed at the opposite positions, thereby forming a height difference corresponding to $(\lambda_0/4)*r$ (r is a real number) with respect to a wavelength $\lambda_0$ of incident light.

Figure 10B:
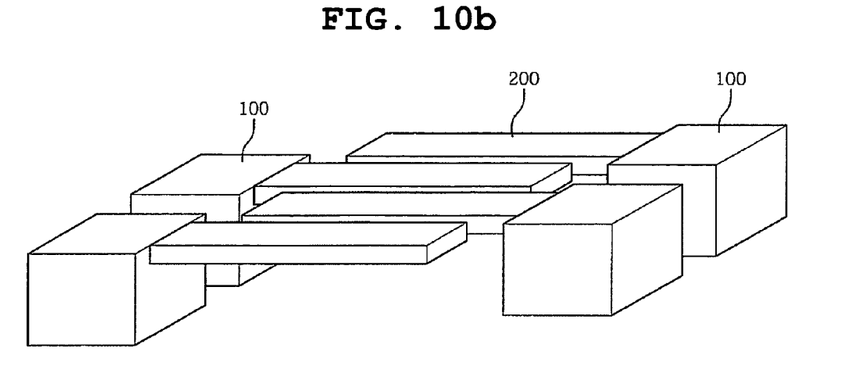

Furthermore, the support units 100 function to support the first ends of cantilevers 200 that diffract and reflect incident light. As shown in FIG. 10b, the support units 100 may be formed in box shapes and arranged in such a way that support units 100 arranged at positions on a side alternate with support units 100 arranged at positions on an opposite side.

The cantilevers 200 are constructed in such a way that the first ends thereof are alternately attached to and supported by support units 100 arranged at opposite positions, and the second ends thereof are free, and are adapted to bend (curve) according to actuating power. In particular, the cantilevers 200 are manufactured to have a height of 3 to 5 μm and a length of 100 to 120 μm using an SOI.

As described above, the cantilevers 200 are supported in such a way that the first ends thereof are alternately attached to the support units 100 arranged at opposite positions, and the support axes thereof are formed at opposite positions at the same height, thus forming a height difference that allows the incident light to be diffracted and reflected when the neighboring cantilevers 200 bend in opposite directions.

The alternately arranged neighboring cantilevers 200 bend in opposite directions due to the support axes formed at opposite positions, so that the height difference between the neighboring cantilevers 200 is easily formed even in the case where low voltage is applied to the cantilevers 200.

Figure 11:
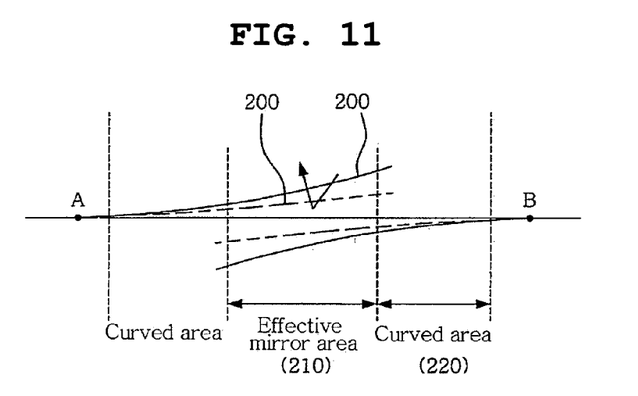
FIG. 11 is a view showing the curved areas and effective mirror areas of the symmetric cantilevers according to actuating power in accordance with another embodiment of the present invention.

The operation of the cantilevers 200 is described in detail with reference to FIG. 11. When actuating power for bending cantilevers 200 by a certain angle is applied by the actuating units 300, the alternately arranged neighboring cantilevers 200 bend (curve) according to the amount of the actuating power, thereby forming curved areas 210 where the cantilevers 200 start to bend and effective mirror areas 220 that allow the cantilevers 200 to reflect the incident light.

The effective mirror areas 220 of the cantilevers 200 bend in opposite directions while maintaining the directions normal to bending directions, respectively, thereby forming a certain height difference between the effective mirror areas 220 of the neighboring cantilevers 200.

In this case, the height difference between the effective mirror areas 220 corresponds to $(\lambda_0/4)*r$ (r is a real number) with respect to a wavelength $\lambda_0$ of incident light, thereby allowing the incident light to be reflected and diffracted.

According to the above-described principle, the cantilevers 200 reflect and diffract the incident light depending on the height difference between the alternately arranged neighboring cantilevers 200, thereby forming reflected beams having a 0th order diffraction coefficient and diffracted beams having a certain diffraction coefficient.

In that case, it is possible to control the extent of bending (curving) according to the amount of the actuating power applied to the cantilevers 200, so that it is possible to control the extent of diffraction with respect to the incident light.

Figure 12:
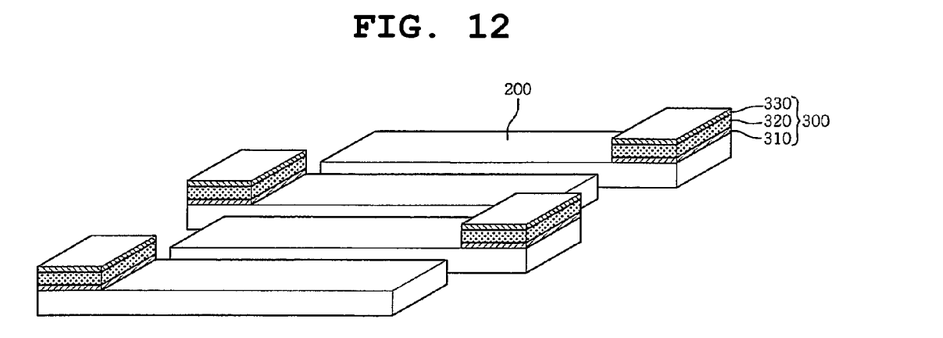
FIG. 12 is a view showing actuating units formed on the first ends of the cantilevers, respectively, according to another embodiment of the present invention.

The actuating units 300 are formed on the first ends of the cantilevers 200, respectively, and adapted to supply actuating power for bending the cantilevers 200 by a certain angle.

As shown in FIG. 6, each of the actuating units 300 includes a lower electrode layer 310, a piezoelectric layer 320 and an upper electrode layer 330.

The construction and operation of the actuating units 300 are the same as those of the actuating units according to the previous embodiment of the present invention, thus omitting a detailed description of these actuating units 300.

A process of operating a diffractive light modulator using cantilevers according to another embodiment of the present invention is described in detail with reference to FIGS. 13a to 14 below.

FIGS. 13a to 13d are views showing operation of cantilevers that bend in opposite directions according to actuating power in accordance with the present invention. FIG. 14 is a view illustrating the light paths of reflected and diffracted beams based on the bending angles of the neighboring cantilevers in accordance with the present invention.

The operation of the cantilevers that bend in opposite directions according to actuating power in accordance with the present invention is described in detail with reference to FIGS. 8a to 8f below.

Figure 13A:
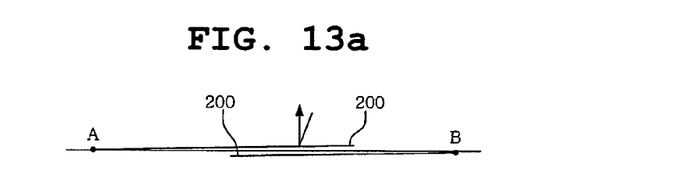
FIGS. 13a to 13d are views showing the operation of the symmetrically neighboring cantilevers that bend in opposite directions according to actuating power in accordance with another embodiment of the present invention.
Figure 13B:
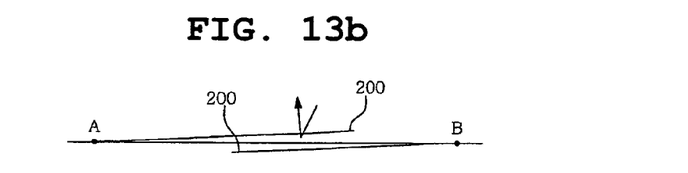
Figure 13C:
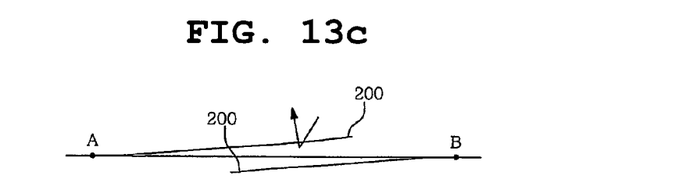
Figure 13D:
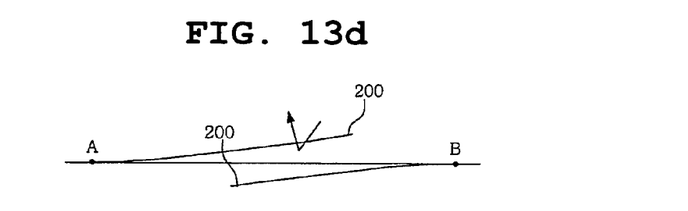

As shown in FIG. 13a, the cantilevers 200 are constructed in such a way that the first ends thereof are alternately attached to and supported by support units and the second ends thereof are not supported by the support units, and support axes A and B are formed at opposite positions at the same height, respectively.

When actuating power is applied to the alternately arranged neighboring cantilevers 200 as described above, the neighboring cantilevers 200 bend (curve) in opposite directions according to the amount of the applied actuating power, so that the neighboring cantilevers 200 bend in opposite directions by a certain angle.

In this case, curved areas 210 where the cantilevers start to bend and effective mirror areas 220 that reflect incident light are formed due to the bending (curving) of the cantilevers 200 caused by the actuating power.

In that case, the curved areas 210 of the cantilevers 200 are areas to which a bending force is applied due to the actuating power applied by the actuating units, so that bending occurs. The effective mirror areas 220 are areas in which a planar state is maintained due to the absence of shear stress and which allow the incident light to be reflected and diffracted.

As described above, when the alternately arranged neighboring cantilevers 200 bend in opposite directions, the effective mirror areas 220 of the neighboring cantilevers 200 bend in the directions tangential to bending directions, respectively, thereby forming a height difference that corresponds to $(\lambda_0/4)*r$ (r is a real number) with respect to a wavelength $\lambda_0$ of incident light.

In that case, it is possible to control the gap between the effective mirror areas 220 of the neighboring cantilevers 200 by controlling the amount of the bending of the cantilevers 200, so that it can be possible to control the extent of diffraction with respect to the incident light.

According to the above-described principle, the alternately arranged neighboring cantilevers 200 reflect and diffract incident light depending on the height difference between the effective mirror areas 220, thus forming reflected beams having a 0th order diffraction coefficient or diffracted beams having a certain diffraction coefficient.

The operation of the cantilevers is described in detailed with reference to FIG. 14. In the case where actuating power is not applied to the neighboring cantilevers 200 that are supported by the symmetric support units 100 in an alternative manner ($\theta=0$), the effective mirror areas of the neighboring cantilevers 200 function as a reflector that reflects the incident light.

In the case where a certain amount of actuating power is applied from the actuating units 300 to the alternately arranged neighboring cantilevers 200, the neighboring cantilevers 200 bend in opposite directions around the support axes A and B.

Due to such a bending phenomenon generated in opposite directions, the neighboring cantilevers 200 bend in opposite directions by a certain angle according to the amount of the applied actuating power, thereby forming a certain angle ($\theta=\theta_1$ or $\theta=\theta_2$) between the neighboring cantilevers 200.

In this case, the effective mirror areas 200 of the neighboring cantilevers 200, which bend in opposite directions, bend in the directions tangential to bending directions, respectively, so that a height difference that corresponds to $(\lambda_0/4)*n$ with respect to a wavelength $\lambda_0$ of incident light is formed between the effective mirror areas 220

That is, the effective mirror areas 220 of the neighboring cantilevers 200, respectively, form the height difference that corresponds to $(\lambda_0/4)*r$ with respect to a wavelength $\lambda_0$ of incident light, thereby functioning as a diffractor that diffracts an incident beam by a certain angle.

In this case, the reflected and diffracted beams caused by the height difference between the alternately arranged neighboring cantilevers 200 are reflected and diffracted by various angles, but move forward in a light path direction by cylindrical lenses that are an angle correction unit 400 arranged in a direction in which the cantilevers 200 are arranged.

As described above, the present invention is constructed in such a way that the first ends of cantilevers are secured on support units and the second ends of the cantilevers are not secured on the support units. Accordingly, the present invention can employ thick cantilevers, unlike a conventional light modulator constructed using thin ribbon-shaped reflectors, so that the present invention is advantageous in that the light modulator can be easily manufactured.

Furthermore, the present invention is constructed in such a way that neighboring cantilevers bend in the same direction or opposite directions around different support axes according to applied actuating power, and the present invention is advantageous in that a height difference, which allows incident light to be reflected and diffracted, can be easily formed between the neighboring cantilevers even by low voltage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A diffractive light modulator, comprising:
   one or more support units;
   a plurality of cantilevers constructed in such a way that first ends thereof are supported by the support units and second ends thereof are free, the first ends thereof being supported by the support units, respectively, so that each of the first ends, together with neighboring one of the first ends, forms a predetermined length offset; and
   actuating units formed on the first ends of the cantilevers, respectively, and adapted to apply actuating power;
   wherein the neighboring cantilevers bend in a same direction around support axes that are formed at different positions due to the offset, thereby forming a height difference between the neighboring cantilevers.

2. The diffractive light modulator as set forth in claim 1, wherein each of the support units comprises a body, and protrusions integrated with the body at regular intervals so as to form an offset between the neighboring cantilevers.

3. The diffractive light modulator as set forth in claim 1, wherein the support units are formed in box shapes, and arranged to be spaced apart from each other by a predetermined distance and to allow a predetermined length offset to be formed between the neighboring support units so as to form an offset between the neighboring cantilevers.

4. The diffractive light modulator as set forth in claim 1, wherein the support units are formed in box shapes, and arranged in such a way that support units with protrusions and support units without protrusions are alternately arranged in a line so as to form an offset between the neighboring cantilevers.

5. The diffractive light modulator as set forth in claim 1, wherein the cantilevers form curved areas where the cantilevers start to bend and effective mirror areas that reflect and diffract incident light, the effective mirror areas bending in a direction tangential to the bending direction when the neighboring cantilevers bend in a same direction, thereby forming a certain height difference between the neighboring cantilevers.

6. The diffractive light modulator as set forth in claim 5, wherein the height difference between the effective mirror areas is $(\lambda_0/4)*r$ (r is a real number) with respect to a wavelength $\lambda_0$ of incident light.

7. The diffractive light modulator as set forth in claim 1, further comprising an angle correction unit arranged in a direction in which the cantilevers are arranged, and adapted to correct different reflection angles of diffracted beams, caused by a bending difference between the cantilevers, to a light path direction.

8. The diffractive light modulator as set forth in claim 1, wherein each of the actuating units comprises:
   a lower electrode layer formed on each of the cantilevers and adapted to receive actuating power from an external power source;
   a piezoelectric layer formed on the lower electrode layer, and adapted to generate vertical and lateral actuating power through shrinkage and expansion according to the applied actuating power; and
   an upper electrode layer formed on the piezoelectric layer, and adapted to supply the actuating power, supplied from the external power source to the piezoelectric layer together with the lower electrode layer.

9. A diffractive light modulator, comprising:
   support units arranged at opposite positions while remaining spaced apart from each other by a predetermined distance;
   a plurality of cantilevers constructed in such a way that first ends thereof are attached to the support units and second ends thereof are free, and alternately supported by the support units; and
   actuating units formed on the first ends of the cantilevers, respectively, and adapted to apply actuating power;
   wherein the alternately arranged neighboring cantilevers form a height difference while bending in opposite directions around different support axes.

10. The diffractive light modulator as set forth in claim 9, wherein the support units are formed in such a way that longitudinal axes thereof are formed in a direction in which the cantilevers are arranged, and are formed in rectangular shapes.

11. The diffractive light modulator as set forth in claim 9, wherein the support units are formed in box shapes, and arranged in such a way that support units arranged at positions on a side alternate with support units arranged at positions on an opposite side.

12. The diffractive light modulator as set forth in claim 9, wherein the cantilevers form curved areas where the cantilevers start to bend and effective mirror areas that reflect and diffract incident light according to actuating power, and the effective mirror areas form a certain height difference between the cantilevers while bending in directions tangential to bending directions of the neighboring cantilevers, respectively, when the neighboring cantilevers bend in opposite directions.

13. The diffractive light modulator as set forth in claim 12, wherein the height difference between the effective mirror areas corresponds to $(\lambda_0/4)*n$ with respect to a wavelength $\lambda_0$ of incident light.

14. The diffractive light modulator as set forth in claim 9, further comprising an angle correction unit arranged in a direction in which the cantilevers are arranged, and adapted to correct different reflection angles of diffracted beams, caused by a bending difference between the cantilevers, to a light path direction.

15. The diffractive light modulator as set forth in claim 9, wherein each of the actuating units comprises:
   a lower electrode layer formed on each of the cantilevers and adapted to receive actuating power from an external power source;
   a piezoelectric layer formed on the lower electrode layer, and adapted to generate vertical and lateral actuating power through shrinkage and expansion according to the applied actuating power; and
   an upper electrode layer formed on the piezoelectric layer, and adapted to supply the actuating power, supplied from the external power source to the piezoelectric layer together with the lower electrode layer.

* * * * *